W. Morehouse,
Mop Holder.

N° 58,872.   Patented Oct. 16, 1866.

Witnesses:
Henry Sylvester
J. Z. Merriam

Inventor:
Wm. Morehouse
by
Mason, Fenwick & Lawrence

UNITED STATES PATENT OFFICE.

WILLIAM MOREHOUSE, OF BUFFALO, NEW YORK.

IMPROVED MOP-HOLDER.

Specification forming part of Letters Patent No. 58,872, dated October 16, 1866.

*To all whom it may concern:*

Be it known that I, WILLIAM MOREHOUSE, of Buffalo, in the county of Erie and State of New York, have invented a new and Improved Mop-Holder; and I do hereby declare that the following is a full, clear, and exact description thereof, reference being had to the accompanying drawings, making a part of this specification, in which—

Figure 1:
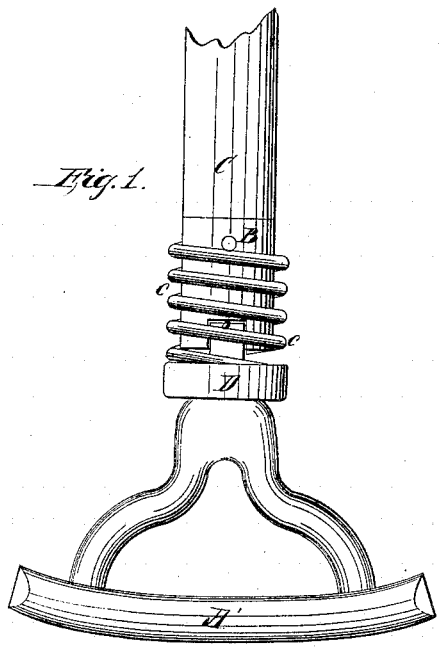
Figure 2:
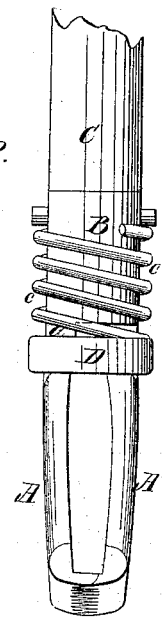
Figure 4:
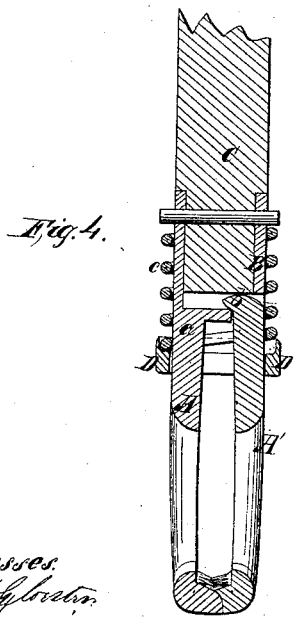
Figure 3:
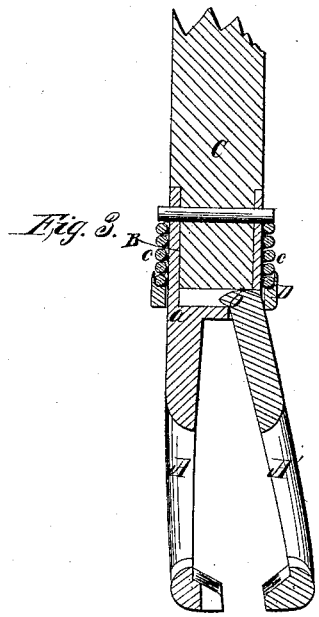

Figure 1 is a side view of the improved mop-holder with its jaws closed. Fig. 2 is an edge view of the same. Figs. 3 and 4 are sectional views showing the jaws in two positions.

Similar letters of reference indicate corresponding parts in the several figures.

This invention and improvement in mop-holders consist in the employment of a sliding ring, which is acted upon by a spring, in conjunction with pivoted clamping-jaws, for the purpose of holding said jaws firmly together when desired, and also for admitting of the ready release of the mop, as will be hereinafter described.

It also consists in a novel mode of attaching one of the jaws to the ferrule of the handle, so as to dispense with a pivot-connection, and yet to have such jaw free to open and close, as will be hereinafter described.

To enable others skilled in the art to understand my invention, I will describe its construction and operation.

In the accompanying drawings, A A' represent the two clamping-jaws of the mop-holder, between which the mop is confined. These jaws may be constructed of any suitable form; but I prefer the form shown in the drawings, in which it will be seen that the clamping-bars are provided with teeth, to more firmly hold the cloth or mop between them. On the contracted shank $a$ of the jaw A a tube or ferrule, B, is formed, which is adapted to receive the handle C, as shown in the sectional views, Figs. 3 and 4. The end of the handle C does not extend entirely through the ferrule B, but leaves a space for receiving the hook $b$, which is formed on the contracted shank of the movable jaw A', as shown in the sectional views. The end of ferrule B is slotted to receive the shank-hook $b$, and to stay jaw A' against lateral movement. The hook $b$ is rounded on its end and face, so as to form an attachment for the jaw A' with its ferrule B, and to allow of a free vibration of said jaw.

The movable jaw A' is held in place against the fixed jaw A by means of a sliding ring or collar, D, which encompasses the shanks of the two jaws and slides freely upon said shanks and the ferrule B. The ring D is acted upon by a spring, $c$, which is coiled around the ferrule B, and which keeps this ring in the position shown in Figs. 1, 2, and 3, but allows it to be drawn back upon the ferrule B, as shown in Fig. 3, when it is desired to open the jaws.

I do not confine that part of my invention which relates to the forcing of the jaws together to the use of a hooked connection, $b$, as a pivot-connection of the movable jaw will answer a very good purpose with a sliding ring which is acted upon by a spring. I prefer to construct the mop-holder as I have herein described, and thereby dispense with a pivot-joint.

Having thus described my invention, what I claim as new, and desire to secure by Letters Patent, is—

1. The combination of a loose and a fixed clamping-jaw, the former being connected to the ferrule B of the latter by means of a hooked shank, $b$, substantially as described.

2. The construction of a ferrule, B, upon the shank of the jaw A, for receiving the handle C, and also the shank of the movable jaw A', substantially as described.

3. The combination of a sliding collar, D, which is acted upon by a spring, $c$, with the fixed and movable jaws A A', substantially as described.

WM. MOREHOUSE.

Witnesses:
 JACOB DAVIS,
 ANGUS C. TURNER.